United States Patent
Huelke et al.

(10) Patent No.: US 10,005,224 B2
(45) Date of Patent: Jun. 26, 2018

(54) METHOD FOR FORMING A HEADLINER

(71) Applicant: Ford Global Technologies, LLC, Dearborn, MI (US)

(72) Inventors: David Huelke, Milan, MI (US); Jeffrey Todd Baxter, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 15/062,851

(22) Filed: Mar. 7, 2016

(65) Prior Publication Data
US 2016/0185031 A1 Jun. 30, 2016

Related U.S. Application Data

(62) Division of application No. 14/181,784, filed on Feb. 17, 2014, now Pat. No. 9,302,458.

(51) Int. Cl.
| | |
|---|---|
| *B60R 13/02* | (2006.01) |
| *B29C 53/04* | (2006.01) |
| *B32B 27/12* | (2006.01) |
| *B32B 27/32* | (2006.01) |
| *B32B 27/40* | (2006.01) |
| *B32B 27/08* | (2006.01) |
| *B29C 53/06* | (2006.01) |
| *B32B 38/00* | (2006.01) |

(Continued)

(52) U.S. Cl.
CPC ............ *B29C 53/066* (2013.01); *B32B 5/022* (2013.01); *B32B 7/12* (2013.01); *B32B 27/08* (2013.01); *B32B 27/12* (2013.01); *B32B 27/20* (2013.01); *B32B 27/32* (2013.01); *B32B 27/40* (2013.01); *B32B 38/0012* (2013.01); *B32B 38/0036* (2013.01); *B32B 38/105* (2013.01); *B60R 13/0212* (2013.01); *B60R 13/0218* (2013.01); *B29K 2075/00* (2013.01); *B29K 2105/0097* (2013.01); *B29K 2105/08* (2013.01); *B29K 2309/08* (2013.01); *B29L 2009/00* (2013.01); *B29L 2031/3011* (2013.01); *B32B 2262/101* (2013.01); *B32B 2264/105* (2013.01); *B32B 2307/302* (2013.01); *B32B 2605/003* (2013.01); *B32B 2605/08* (2013.01); *Y10T 156/1034* (2015.01)

(58) Field of Classification Search
None
See application file for complete search history.

(56) References Cited

U.S. PATENT DOCUMENTS

| | | | |
|---|---|---|---|
| 5,494,737 | A | 2/1996 | Sakai et al. |
| 5,962,089 | A | 10/1999 | Jones et al. |

(Continued)

FOREIGN PATENT DOCUMENTS

| | | |
|---|---|---|
| DE | 4308925 A1 | 2/1995 |
| DE | 9420596 U1 | 3/1995 |
| EP | 0720902 A2 | 10/1996 |

*Primary Examiner* — Barbara J Musser
(74) *Attorney, Agent, or Firm* — Marla Johnston; Brooks Kushman P.C.

(57) ABSTRACT

A headliner includes a ceiling and an edge flange extending away from the ceiling. The edge flange has a backing section at a free end and a wall section connected to the ceiling. An edge fold is formed on the headliner by a method that includes heating the flange and folding the backing section over and parallel to the ceiling. The method also includes forming a reverse turned edge by folding the backing section over the wall section and compressing the backing section against the wall section.

14 Claims, 7 Drawing Sheets

(51) Int. Cl.
*B32B 7/12* (2006.01)
*B32B 5/02* (2006.01)
*B32B 27/20* (2006.01)
*B29K 75/00* (2006.01)
*B29K 105/00* (2006.01)
*B29K 105/08* (2006.01)
*B29K 309/08* (2006.01)
*B29L 9/00* (2006.01)
*B29L 31/30* (2006.01)

(56) References Cited

U.S. PATENT DOCUMENTS

| | | |
|---|---|---|
| 6,161,895 A | 12/2000 | Jaeckle et al. |
| 7,874,832 B2 | 1/2011 | Kujawa |
| 2003/0232160 A1 | 12/2003 | Spengler |
| 2011/0274921 A1 | 11/2011 | Li et al. |

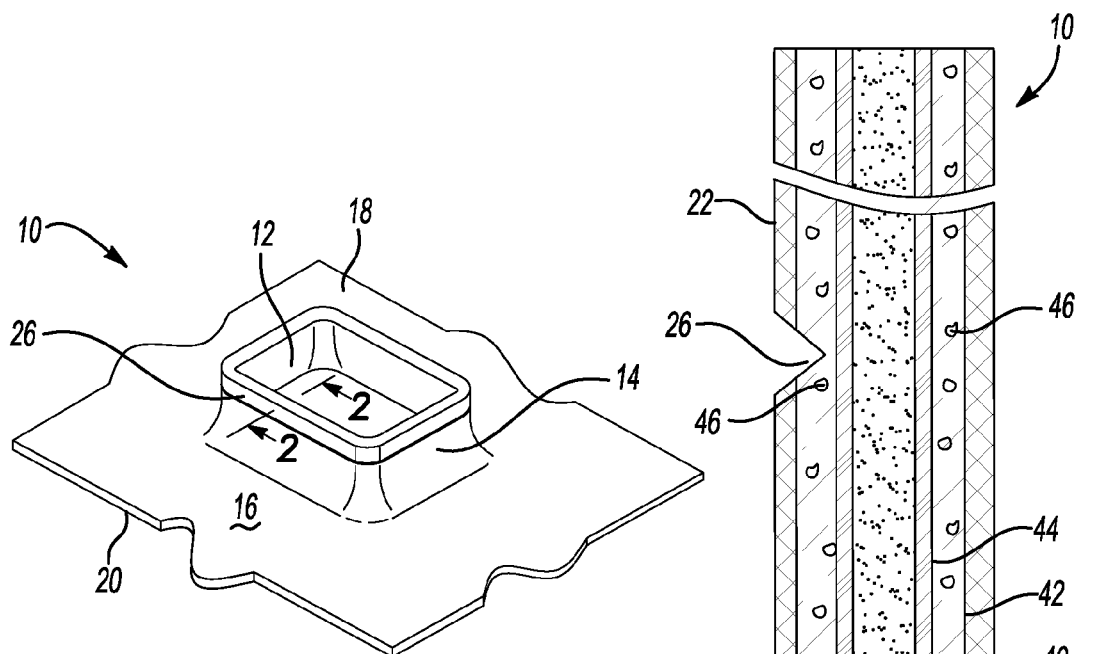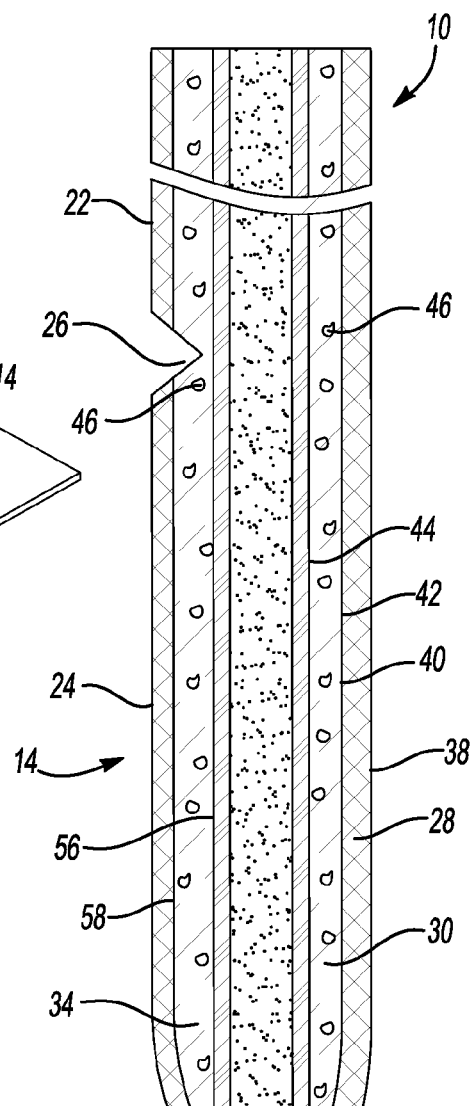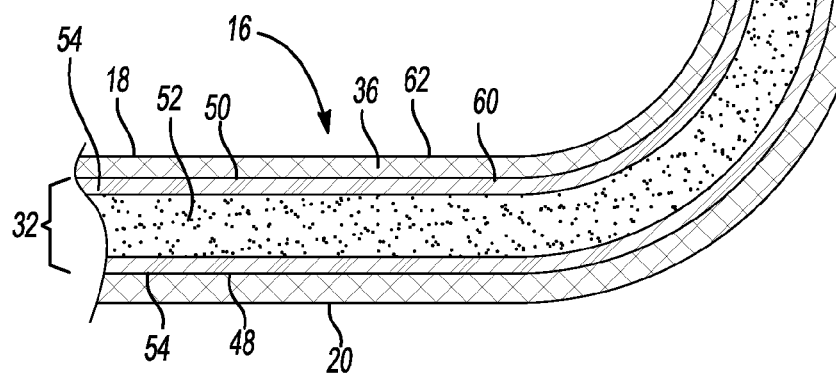
Fig-1
Fig-2

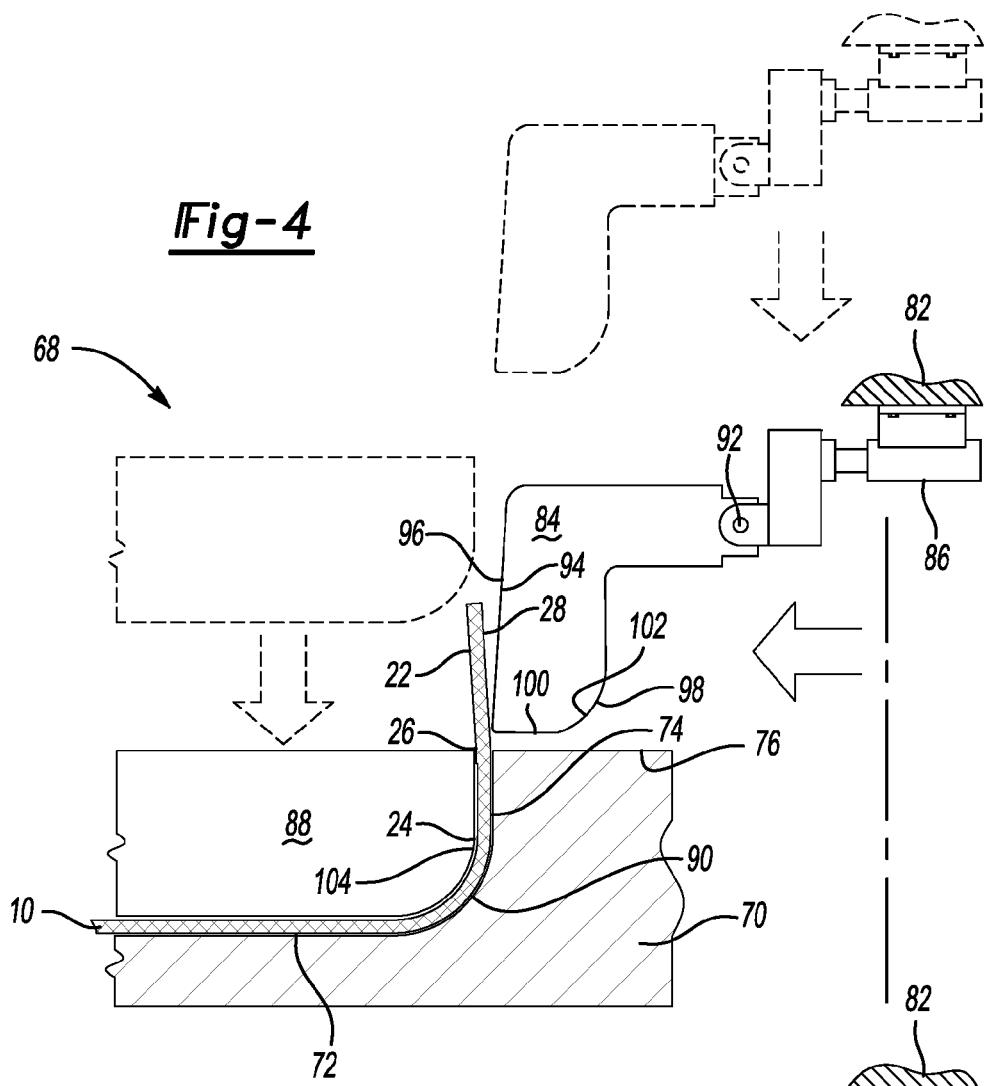
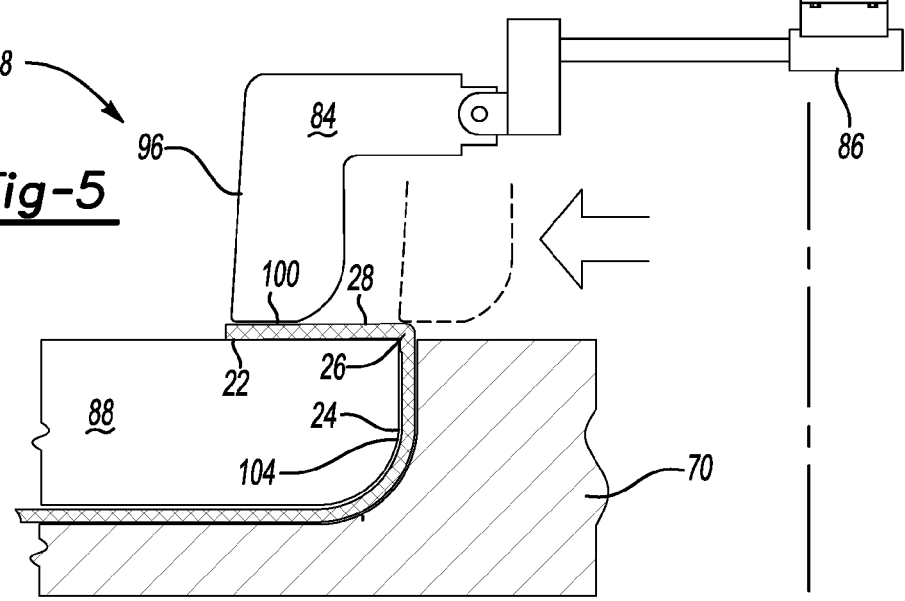

METHOD FOR FORMING A HEADLINER

CROSS-REFERENCE TO RELATED APPLICATIONS

This application is a division of U.S. application Ser. No. 14/181,784, filed Feb. 17, 2014, now U.S. Pat. No. 9,302,458, issued Apr. 5, 2016, the disclosure of which is hereby incorporated in its entirety by reference herein.

TECHNICAL FIELD

The present disclosure relates to a headliner and a method of forming a headliner.

BACKGROUND

Vehicles typically have headliners covering an interior side of the roof to muffle sounds and make the cabin aesthetically pleasing. Vehicles may include a sun or moon roof. When the vehicle includes a sunroof, the headliner includes a cutout portion for providing access to the sunroof. A finished edge may be provided at the cutout portion for attaching the headliner to the roof. The finished edge may be a folded edge formed by folding the headliner back on itself.

SUMMARY

According to one aspect of this disclosure, a method is disclosed for forming a headliner. The headliner includes a ceiling and an edge flange extending away from the ceiling. The edge flange has a backing section at a free end and a wall section connected to the ceiling. The method comprises heating the flange, then folding the backing section over and parallel to the ceiling, then forming a reverse turned edge by folding the backing section over the wall section, and compressing the backing section against the wall section to form an edge fold on the headliner.

According to another aspect of this disclosure, an alternative method is disclosed for forming a bonded edge fold on a headliner. The headliner includes a ceiling and an edge flange extending away from the ceiling. The edge flange has a backing section at a free end and a wall section connected to the ceiling. The method comprises positioning the headliner on a nest that includes a base that supports the ceiling and a forming wall that supports the edge flange. The wall section is clamped against the forming wall with a heating element. The edge flange is heated with the heating element to activate an adhesive layer within the edge flange. The method also includes advancing a slide in a first direction to fold the backing section over the heating element to be disposed substantially parallel to the ceiling. Moving the slide perpendicular to the first direction toward the nest to fold the backing section over the wall section. Retracting the slide in a second direction opposite the first direction and compressing the backing section against the wall section where the adhesive layer bonds the backing section to the wall section to form the bonded edge fold.

The step of compressing the backing section against the wall section may force the adhesive layer to seep through a backing layer of the headliner and bond the backing layers on the wall section and the backing section to each other.

The method may further include cutting a notch in the edge flange where the backing section and the wall section meet, and retracting the heating element before moving the slide towards the nest.

According to another aspect of this disclosure, a machine for forming a bonded edge fold on a headliner is disclosed. The headliner includes a ceiling and an edge flange extending upwardly from the ceiling. The edge flange has a wall section and a backing section. The machine comprises a lower die that receives the headliner. The lower die has a base that supports the ceiling and a forming wall that supports the edge flange. An upper die is disposed above the lower die to vertically reciprocate relative to the lower die. A heating element is attached to the lower die to clamp the wall section to the forming wall and activate an adhesive layer within the edge flange. A slide connected to the upper die includes a folding face and a clamping face. At least one actuator is operable to advance the slide in a first horizontal direction to engage the folding face with the backing section to bend the backing section substantially parallel to the ceiling. The at least one actuator is also operable to retract the slide in a second horizontal direction opposite the first to pull the clamping face against the backing section and compress the backing section against the wall section to form a bonded edge fold.

According to an alternative embodiment of the machine, the clamping face may include a curved portion and the forming wall may include an arcuate portion. The curved portion and the arcuate portion may cooperate with one another when the slide is retracted.

According to an alternative embodiment of the machine, two actuators may be used to advance the slide. The second actuator may be connected to the upper die and may be operable to engage with the folding face to move the slide in the second horizontal direction and compress the backing section against the wall section. The actuators may be pneumatic cylinders.

According to an alternative embodiment of the machine, the upper die may vertically reciprocate and may include a downward phase where the upper die moves towards the lower die and engages the clamping face against the backing section to bend the backing section towards the wall section.

According to an alternative embodiment of the machine, the machine may further include a plurality of support members attached to the lower die and extending upwardly and substantially normal to the lower die. The platform may be operable to vertically reciprocate along the support members with respect to the lower die. Vertical reciprocation of the platform causes the upper die to vertically reciprocate as well.

The above aspects of this disclosure and other aspects are described in greater detail below with reference to the attached drawings.

BRIEF DESCRIPTION OF THE DRAWINGS

FIG. 1 is a perspective view of a headliner before being edge folded.

FIG. 2 is a cross-section view of a headliner illustrating the various layers that comprise the headliner.

FIG. 4 is a cross-section view of the edge folding machine illustrated in FIG. 3 in a first phase of operation.

FIG. 5 is a cross section view of the edge folding machine illustrated in FIG. 3 in a second phase of operation.

DETAILED DESCRIPTION

Figure 3:
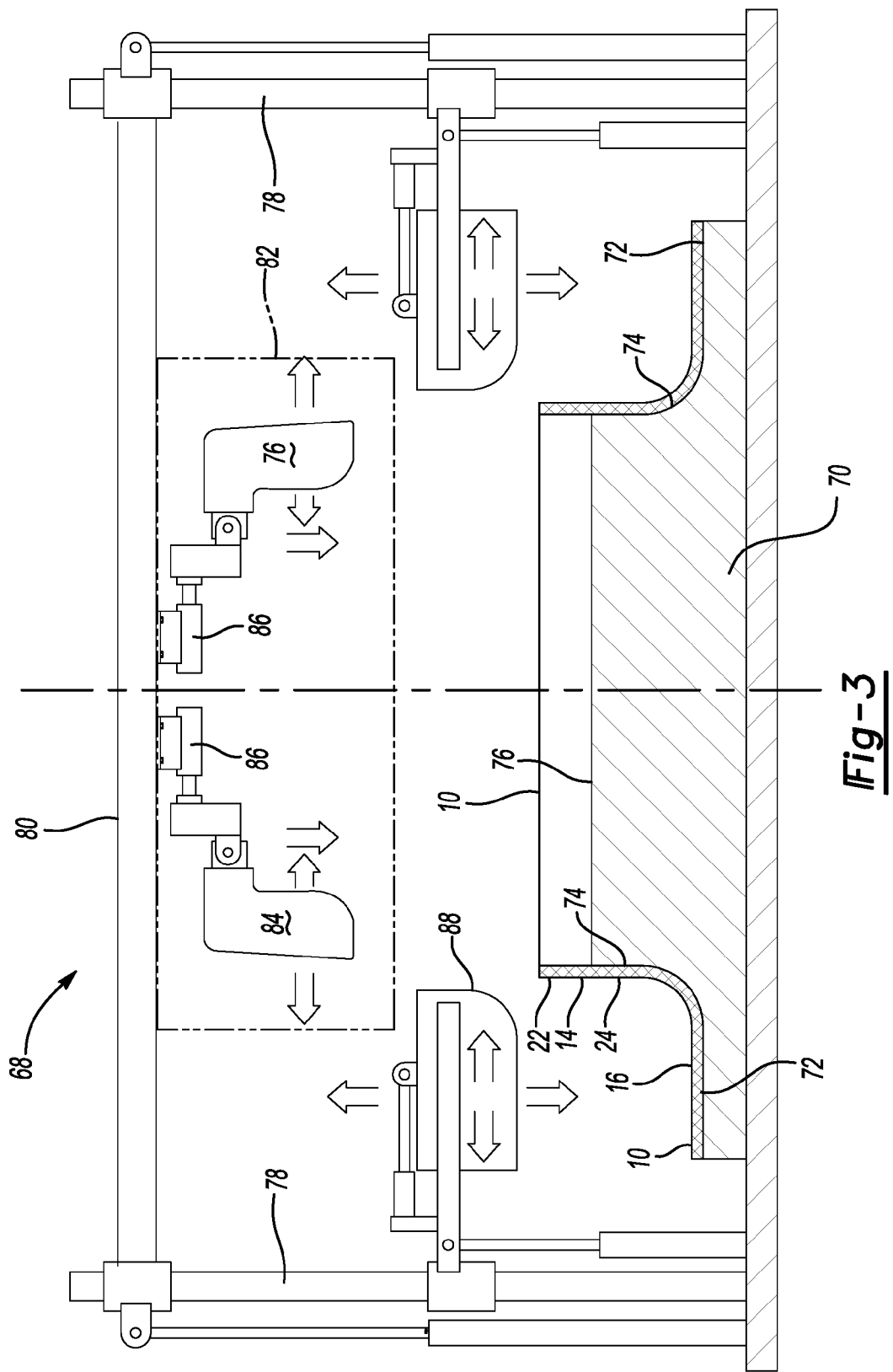
FIG. 3 is a cross-section view of one example of an edge folding machine.

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Referring to FIG. 1, a headliner 10 is shown prior to being edge folded. The headliner 10 includes a cut-out 12 that provides access to the sun or moon roof. The headliner 10 further includes a ceiling 16 and an edge flange 14. The edge flange 14 surrounds the cut-out 12. The headliner 10 has a roof side 18 and a cabin side 20 opposite the roof side. When installed in the vehicle, the roof side 18 is disposed proximate the roof of the vehicle and generally cannot be seen. The cabin side 20 forms the ceiling of the cabin and is visible to the occupants.

Referring to FIG. 2, a cross-section of a portion of the headliner 10 is shown prior to being edge folded. The headliner 10 includes a ceiling 16 and an edge flange 14. The edge flange 14 is connected to the ceiling 16 and is bent away from the ceiling 16. The edge flange 14 includes a backing section 22 and a wall section 24. The backing section 22 is the section of the headliner 10 that is folded during the edge folding process. A notch 26 is cut into the edge flange 14 between the backing section 22 and the wall section 24.

The headliner 10 is made of a plurality of layers. The headliner 10 includes a cover layer 28, a first adhesive layer 30, a core 32, a second adhesive layer 34, and a backing layer 36. The cover layer 28 is provided on the cabin side 20 of the headliner 10. The cover layer 28 includes a visible surface 38 and a hidden surface 40 disposed opposite the visible surface 38. The cover layer 28 may be made of any suitable material, such as a fabric.

A first adhesive layer 30 is disposed between the cover layer 28 and the core 32. The first adhesive layer 30 includes a first surface 42 and a second surface 44 disposed opposite the first surface 42. The first surface 42 may be disposed against or be laminated to the hidden surface 40 of the cover layer 28. The first adhesive layer 30 may facilitate movement of the cover layer 28 relative to the core 32. The first adhesive layer 30 may be locally disposed near portions of the headliner 10 that will be folded, rather than as a continuous layer that extends across the entire headliner 10. For example, the first adhesive layer 30 extends along the edge flange 14 of the headliner 10. In addition, the first adhesive layer 30 may include particles 46 that facilitate heating of the first adhesive layer 30. For example, the particles 46 are metallic particles that conduct thermal energy provided by an external source, such as a heating element.

The core 32 is disposed between the cover layer 28 and the backing layer 36 in the ceiling 16 and is disposed between the first and second adhesive layers 30, 34 in the edge flange 14. The core 32 includes a first surface 48 and a second surface 50 disposed opposite the first surface 48. The first surface 48 may be disposed against or laminated to the hidden surface 40 of the cover layer 28 and/or to the second surface 44 of the first adhesive layer 30. The core 32 includes one or more lightweight material layers that may be porous or non-porous. For example the core 32 includes a polyurethane material layer 52 sandwiched between two reinforcement mats 54. The reinforcement mats 54 are laminated to or at least partially embedded in the polyurethane material layer 52. The mats 54 may be fiberglass mats. A portion of the flexible polyurethane material layer 52 may be adhered to and pass through the reinforcement mats 54 to facilitate attachment of the reinforcement mat 54 to the polyurethane material layer 52. One or more of the reinforcement mats 54 may be omitted in alternative designs.

The second adhesive layer 34 is disposed between the core 32 and the backing layer 36. Prior to activation, the second adhesive layer 34 includes a first surface 56 and a second surface 58 disposed opposite the first surface 56. The first surface 56 may be disposed against or be laminated to the second surface 50 of the core 32. The second adhesive layer 34 may be disposed near portions or regions of the headliner 10 that will be folded rather than as a continuous layer that extends across the entire headliner 10. For example, the second adhesive layer 34 extends along an edge flange 14 of the headliner 10. The second adhesive layer 34 may include particles 46 that facilitate heating of the second adhesive layer 34. The particles 46 maybe the same type as those in the first adhesive layer 30.

The first and second adhesive layers 30, 34 may be a thermoplastic adhesive, such as a polyolefin film. The adhesive layers 30, 34 may have a higher melting temperature than the curing temperature of the thermosetting polyurethane material layer 52 to allow the polyurethane material layer 52 to be formed and cured into a desired shape and/or bond with the reinforcement mats 54 prior to folding the edge flange 14. For example, the melting temperature of the first and second adhesive layers 30, 34 is approximately ten to fifteen degrees Celsius greater than the curing temperature of the polyurethane material layer 52.

The backing layer 36 is provided on a roof side 18 of the headliner 10 and is generally not visible when installed on the vehicle. The backing layer 36 includes an inner surface 60 and an outer surface 62 disposed opposite the inner surface 60. The backing layer 36 may be made of any suitable material, such as a fabric, felt, or non-woven material. The inner surface 60 is disposed against or be laminated to the second surface 50 of the core 32 in regions without the second adhesive layer 34 and may be disposed against or be laminated to the second surface 58 of the second adhesive layer 34 where the second adhesive layer 34 is present.

Referring to FIG. 3, a cross-section elevation view is shown of the machine 68. The machine 68 is used to form an edge fold on an edge flange 14 of the headliner 10. The machine 68 includes a lower die or nest 70. The lower die 70 has a base 72 and a forming wall 74. The forming wall 74 is sized to match the cut-out 12 and has a flat portion 76 spanning between sides of the forming wall 74. The headliner 10 is placed on the lower die 70 with the forming wall 74 and the flat portion 76 received within the cut-out 12. The base 72 receives and supports the ceiling 16. The forming wall 74 receives and supports the edge flange 14. A plurality of support members 78 are attached to the lower die 70 and extend upwardly away from the lower die 70. A platform 80 is attached to the support members 78 above the lower die 70. The platform 80 is operably coupled to the supports 78 to raise and lower the platform relative to the lower die 70 along the supports 78. An upper die 82 is attached to the platform 80. The upper die 82 includes a plurality of slides 84 and a plurality of actuators 86. The actuators 86 are attached to the upper die 82 to move the slides 84. A heating element 88 is coupled to the lower die. The heating element 88 is adjustable relative to the lower die 70. The heating element 88 is positioned proximate the edge flange 14 to activate the first and second adhesive layers 30, 34 during certain phases of the operation. The heating element 88 is spaced from the edge flange 14 during other phases of the operation. The heating element 88 is also used to clamp the wall section 24 of the headliner 10 to the forming wall 74 during certain folding phases of the operation.

In operation, the headliner 10 is placed on the lower die 70 with the ceiling 16 disposed against the base 72 and the edge flange 14 disposed against the forming wall 74. The platform 80 is then vertically lowered towards the lower die 70. The upper die 82 is attached to the platform 80 that lowers the upper die 82. When the platform 80 is fully lowered, a hollow bottom in the upper die 82 receives a portion of the lower die 70 and a portion of the headliner 10 within the upper die 82.

Referring to FIG. 4, a cross-section view of the machine 68 shows the machine 68 including a lower die or nest 70 having a base 72 and the forming wall 74. The forming wall 74 has an arcuate portion 90. The slide 84 is attached to the actuator 86 at a proximate end 92. The distal end 94 is disposed opposite the proximate end 92. A folding face 96 is formed onto the distal end 94 of the slide 84. The slide 84 also includes a clamping face 98. The clamping face 98 has a straight portion 100 that is joined with the folding face 96 at a common edge and extends towards the proximate end 92. The slide 84 also includes a curved portion 102. The curved portion 102 connects with the straight portion 100 and extends towards the proximate end 92. The curved portion 102 cooperates with the arcuate portion 90 of the lower die 70. The actuator 86 is a bidirectional cylinder that is capable of moving the slide in both first and second directions. For example, the actuator 86 may be a bidirectional hydraulic cylinder or a bidirectional pneumatic cylinder.

The heating element 88 is connected to the lower die 70 and is movable relative to the lower die 70. The heating element 88 fits in close proximity to the base 72 and the forming wall 74. The heating element 88 includes an engagement portion 104. The engagement portion 104 clamps the headliner 10 against the lower die 70. The heating element 88 includes an outer structure and a coil heating element disposed inside the outer structure. The coil heating element generates thermal energy which radiates outwardly from the heating element 88 to activate the first and second adhesive layers 30, 34 in the edge flange 14.

One example of an edge folding process including a sequence of folding steps is described below with reference to FIGS. 4 to 7. Referring specifically to FIG. 4, the machine 68 is shown in a first phase of operation. The headliner 10 is disposed onto the lower die 70 with the ceiling 16 on the base 72 and the wall section 24 on the forming wall 74. The heating element 88 is positioned against the headliner 10. The engagement portion 104 presses the wall section 24 against the forming wall 74 to clamp the wall section 24 in place. The coil heating element inside the heating element 88 generates thermal energy and activates the adhesive layers 30, 34 of the headliner 10. Activation of the adhesive layers may cause them to melt, liquefy, or otherwise become malleable. The first and second adhesive layers may provide lubricity to help allow other layers, such as the covering layer 28 and the backing layer 36, to move or slide without tearing.

The upper die 82 has been lowered towards the lower die 70 with the clamping face 98 of the slide 84 positioned proximate the flat portion 76. The clamping face 98 is vertically positioned just above the notch 26. The folding face 96 of the slide 84 is positioned proximate the cover layer 28 of the backing section 22.

Referring to FIG. 5, the machine 68 is shown in a second phase of the process. The slide 84 has been advanced in the first horizontal direction by operation of the actuator 86. As the slide 84 advances, the folding face 96 engages the cover layer 28 of the backing section 22 causing the backing section 22 to fold downwardly over the heating element 88 to be substantially parallel to the lower die 70. The engagement portion 104 of the heating element facilitates a clean fold line at the notch 26 by limiting movement of the wall section 24. Fully advancing the slide 84 in the first horizontal direction positions the straight portion 100 on the cover layer 28 of the wall section 24. At this point in the process, the wall section 24 is disposed between the slide 84 and the heating element 88.

Figure 6:
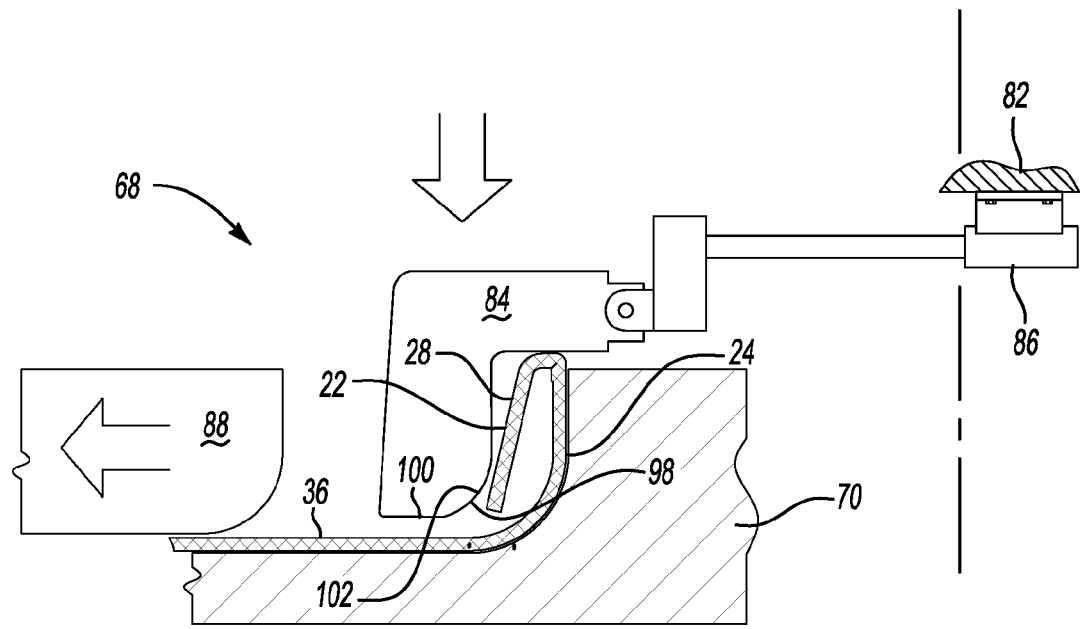
FIG. 6 is a cross section view of the edge folding machine illustrated in FIG. 3 in a third phase of operation.

Referring to FIG. 6, the machine 68 is shown in a third phase of the process. The heating element 88 has been retracted to provide space for the slide 84 to be further lowered. After retraction of the heating element 88, the platform 80 is vertically lowered toward the lower die 70 along support members 78. This causes the clamping face 98 of the slide 84 to engage with the cover layer 28 of the backing section 22 and fold the backing section 22 over the wall section 24. Initial folding is done by engagement of the straight portion 100 against the backing section 22, but as the slide advances further downward, folding is done by engagement of the curved portion 102 against the backing section 22. Upon full downward advancement of the slide 84, the slide 84 is positioned with the curved portion 102 against the backing section 22. The fold has a gap remaining between the backing section 22 and the wall section 24 and is not yet a complete edge fold.

Figure 7:
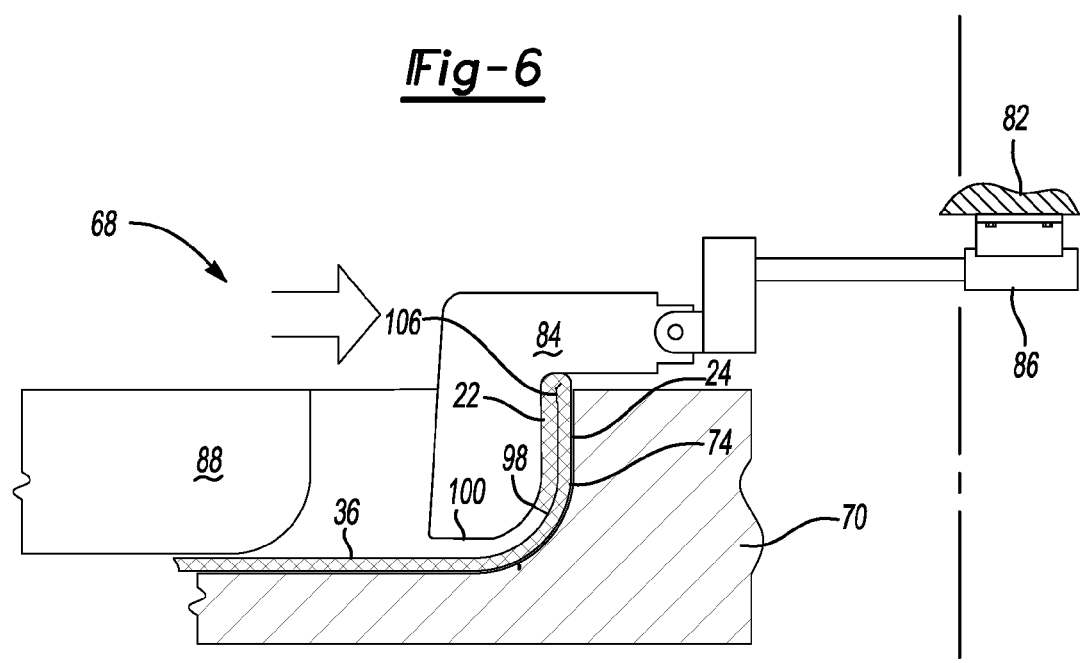
FIG. 7 is a cross section view of the edge folding machine illustrated in FIG. 3 in a fourth phase of operation.

Referring to FIG. 7, the machine 68 is shown in a fourth phase of the process. The slide 84 is retracted in a second horizontal direction opposite the first by the actuator 86. Retraction of the slide 84 causes the curved portion 102 to pull the backing section 22 and compress the backing section 22 against the wall section 24. Full retraction of slide 84 in the second horizontal direction compresses the backing section 22 and the wall section 24 against the forming wall 74 to eliminate any gaps between the backing layers 36 on the backing section 22 and the wall section 24 to form a bonded edge fold 106. During compression, the second adhesive layer 34 seeps through the backing layers 36 and forms a bond between the backing layers on the wall section 24 and the backing section 22. The first adhesive layer 30 may seep into the core 32 during compression to provide additional bonding and rigidity. After compression, the platform 80 is raised to disengage the upper die 82 from the lower die 70 and the headliner 10 is removed from machine 68.

Compressing the backing section 22 against the wall section 24 creates a stronger bonded edge fold as compared to non-compressed edge folds. Having a stronger bond between the backing section 22 and wall section 24 allows the contact area between the sections 22, 24 to be reduced while a shorter edge fold. The length of the edge fold is one factor in determining how closely the headliner 10 may be packaged relative to the roof of the vehicle. A shorter edge fold allows closer packaging of the headliner relative to the roof and provides greater head room.

Figure 8:
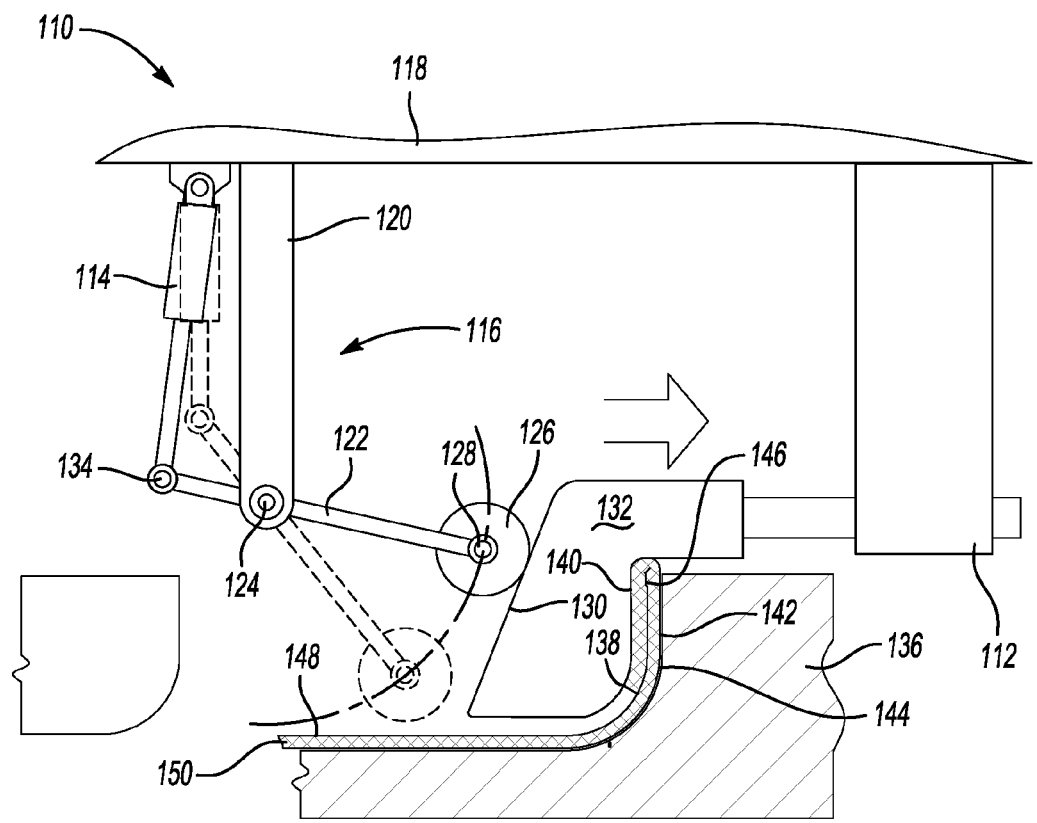
FIG. 8 is a cross-section view of an alternative edge folding machine in a fourth phase of operation.

Referring to FIG. 8, a cross-section view is shown of an alternative design of a machine 110. This design is the same as FIG. 4, except that the machine 110 has two one-way actuators 112 and 114 and includes a compression assembly 116. A compression assembly 116 is attached to the upper die 118. The compression assembly 116 includes a support member 120 attached to the upper die 118. A rod 122 is connected to the support member 120 via a pivot pin 124. The rod 122 may pivot freely about the pivot pin 124. A cam 126 is attached to the rod 122 at a first end 128. The cam 126 engages the first face 130 of the slide 132 during certain phases of operation. The second actuator 114 is attached to the upper die to 118. The second actuator 114 is connected to the rod 122 at a second end 134. The second actuator 114 pushes the second end 134 of the rod 122 downwardly towards the lower die 136. Downward movement of the second end 134 causes the rod 122 to pivot about the pivot pin 124 and causes the first end 128 to rise toward the upper die 118.

FIG. 8 illustrates the machine 110 in a fourth phase of operation. The slide 132 is retracted in a second horizontal direction opposite the first by the compression assembly 116. The second actuator 114 pushes the second end 134 of the rod 122 downwardly causing the first end 128 and the cam 126 to rise toward the upper die 118. Raising the cam 126 causes the cam 126 to push against the folding face 136 of the slide 132. The pushing force causes the slide 132 to retract in the second horizontal direction toward the first actuator 112. Retraction of the slide 132 causes the curved portion 138 to push the backing section 140 and compress the backing section 140 against the wall section 142. Full retraction of the slide 132 in the second horizontal direction compresses the backing section 140 and the wall section 142 against the forming wall 144 to eliminate any gaps between the backing layers 148 on the backing section 140 and the wall section 142 and forms a bonded edge fold 146. During compression, the second adhesive layer 34 seeps through the backing layers 148 and forms a bond between the backing layers on the wall section 142 and the backing section 140. Also during compression, the first adhesive layer 30 seeps into the core 32 to provide additional bonding and rigidity. After compression, the platform 80 is raised to disengage the upper die 118 with the lower die 136 and the headliner 150 is removed from machine 110.

Figure 9:
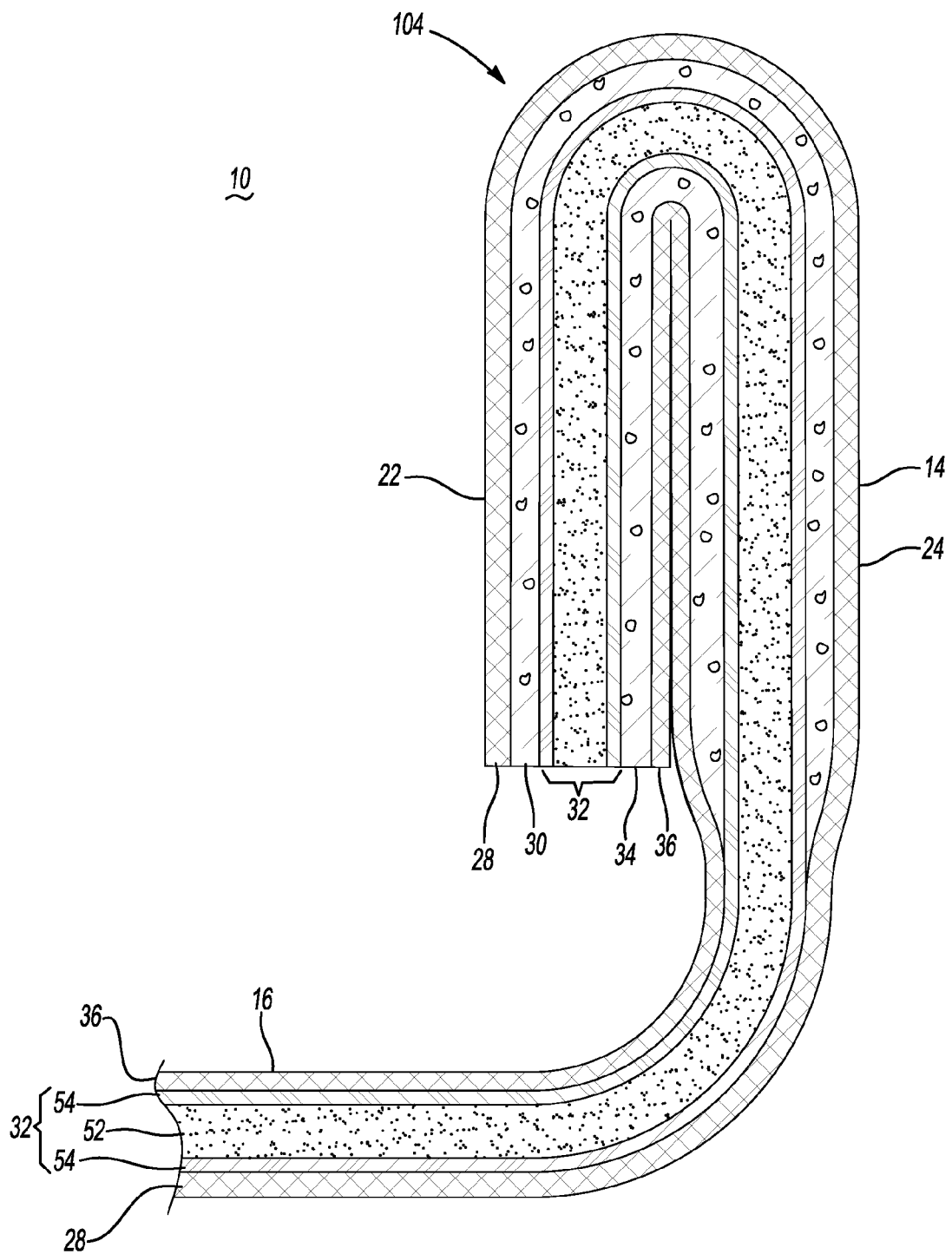
FIG. 9 is a cross-section view of the headliner after edge folding.

Referring to FIG. 9, a headliner 10 is shown post processing by one of the machines 68, 110. The headliner 10 includes a ceiling 16 and an edge flange 14. The edge flange 14 includes a backing section 22 and a wall section 24. The backing section 22 is folded over the wall section 24 forming a bonded edge fold 106. The second adhesive layer 34 seeps into the backing layer 36 on the backing section 22 and the wall section 24 to bond the sections 22, 24 together. The headliner 10 may include an optional notch 26 (as shown in FIG. 2) in the edge flange 14 between the backing section 22 and the wall section 24.

Figure 10:
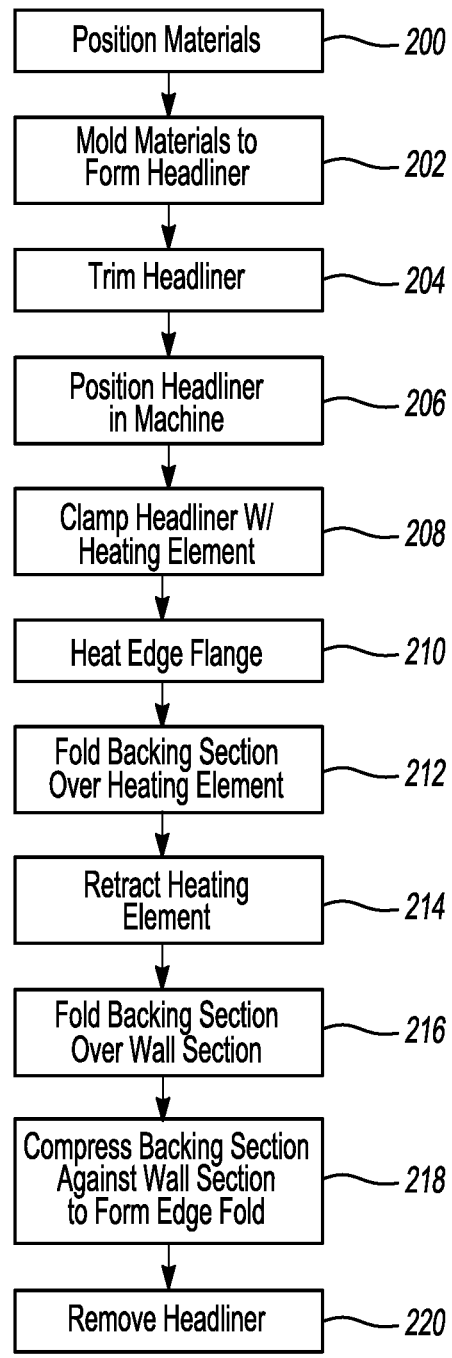
FIG. 10 is a flowchart illustrating one example of a method of edge folding the headliner.

Referring to FIG. 10, a flowchart is shown of one method of fabricating the headliner 10. Other methods of fabrication are contemplated by the present application.

The method begins at 200 by assembling layers that form the headliner 10. The cover layer 28, first adhesive layer 30, core 32, second adhesive layer 34 and backing layer 36 are stacked in sequence relative to each other.

Some of the headliner layers are molded or laminated together at 202. Molding or laminating occurs when heat and pressure are applied in a molding press. The heat applied is enough to activate and cure the polyurethane material layer 52 without melting the first and second adhesive layers 30, 34. As such, the first and second adhesive layers 30, 34 remain in a flexible but solid-state.

The headliner 10 is trimmed to a predetermined shape at 204. The cut-out 12 and the notch 26 maybe formed during this step. Trimming may be done in any suitable manner, such as with a blade, water-jet, laser, or die cut operation.

The headliner 10 is positioned on the lower die 70 at 206 as previously described.

The wall section 24 is clamped against the forming wall 74 by the heating element 88 at 208.

The edge flange 14 is heated by the heating element 88 to activate the adhesive layers 30, 34 within the edge flange 14 at 210. The metal particles 46 disposed within the adhesive layers 30, 34 help facilitate heating of the adhesive layers.

The slide 84 is advanced in a first direction towards the backing section 22 to fold the backing section 22 over the heating element 88 at 212. After advancement, the backing section 22 is disposed substantially parallel to the ceiling 16.

The heating element 88 is retracted away from the forming wall 74 and positioned aside to allow room for additional folding operations by the slide 84 at 214.

The slide 84 is moved perpendicular to the first direction towards the lower die 70 to fold the backing section 22 over the wall section 24 at 216.

The slide 84 is retracted in the second direction opposite the first direction to compress the backing section 22 against the wall section 24 at 218. Compression of the backing section 22 against the wall section 24 causes the adhesive layers 30, 34 to bond the backing section 22 to the wall section 24 forming a bonded edge fold 106.

The headliner 10 is removed from the machine 68. After removal, additional components may be added to the headliner 10 at 220.

While specific embodiments are described above, it is not intended that these embodiments describe all possible forms of the disclosure. The words used in the specification are words of description rather than limitation. Changes may be made to the illustrated embodiments without departing from the spirit and scope of the disclosure as claimed. The features of the illustrated embodiments may be combined to form further embodiments of the disclosed concepts.

What is claimed is:

1. A method of forming a headliner, using a machine including an upper die and a slide connected thereto, comprising:
    clamping the headliner to a nest with a heating element;
    folding the headliner over the heating element with a folding face of the slide to form a folded-over portion; and
    pulling a clamping face of the slide against the folded-over portion to compress the headliner between the slide and the lower die forming an edge fold.

2. The method of claim 1 further comprising lowering the slide to place the folded-over portion in an overlapping relationship with a wall section of the headliner.

3. The method of claim 1 wherein the folding face and the clamping face are on opposite sides of the slide.

4. The method of claim 1 further comprising heating a portion of the headliner with the heating element to activate an adhesive layer within the headliner.

5. The method of claim 1 further comprising positioning the headliner on the lower die such that a base of the lower die supports a ceiling of the headliner and a forming wall of the lower die supports an edge flange of the headliner.

6. The method of claim 5 wherein the clamping face further includes a curved portion, and wherein the forming wall further includes an arcuate portion that cooperates with the curved portion when the slide is pulled to compress the edge flange between the slide and the lower die.

7. The method of claim 1 further comprising cutting a notch in the headliner at a base of the folded-over portion.

8. The method of claim 1 further comprising retracting the heating element before pulling the clamping face of the slide against the folded-over portion.

9. A method of forming a headliner that includes a ceiling and an edge flange extending away from the ceiling, the edge flange having a backing section at a free end and a wall section connected to the ceiling, comprising:

positioning the headliner on a nest that includes a base for supporting the ceiling and a forming wall that supports the edge flange;

clamping the wall section against the forming wall with a heating element;

heating the flange with the heating element;

folding the backing section over the heating element such that the backing section is parallel to the ceiling;

forming a reverse turned edge by folding the backing section over the wall section; and compressing the backing section against the wall section.

10. The method of claim 9 further comprising:

cutting a notch in the edge flange at a boundary between the backing section and the wall section.

11. A method of forming a bonded edge fold on a headliner that includes a ceiling and an edge flange extending away for the ceiling, the edge flange having a backing section at a free end and a wall section connected to the ceiling, the method comprising:

positioning the headliner on a nest that includes a base that supports the ceiling and a forming wall that supports the edge flange;

clamping the wall section against the forming wall with a heating element;

heating the edge flange with the heating element to activate an adhesive layer within the edge flange;

advancing a slide in a first direction to fold the backing section over the heating element to be disposed substantially parallel to the ceiling;

moving the slide perpendicular to the first direction toward the nest to fold the backing section over the wall section;

retracting the slide in a second direction opposite the first direction; and compressing the backing section against the wall section, wherein the adhesive layer bonds the backing section to the wall section to form the bonded edge fold.

12. The method of claim 11 further comprising:

cutting a notch in the edge flange where the backing section and the wall section meet.

13. The method of claim 11 further comprising:

retracting the heating element before moving the slide toward the nest.

14. The method of claim 11 wherein the step of compressing the backing section against the wall section forces the adhesive layer to seep through a backing layer of the headliner and bond the backing layers on the wall section and the backing section to each other.

* * * * *